US006270308B1

(12) United States Patent
Groppel (10) Patent No.: US 6,270,308 B1
(45) Date of Patent: Aug. 7, 2001

(54) WIND GENERATOR

(76) Inventor: Wilhelm Groppel, Im Klusgarton 4, 49324 Melle (DE)

( * ) Notice: Subject to any disclaimer, the term of this patent is extended or adjusted under 35 U.S.C. 154(b) by 0 days.

(21) Appl. No.: 09/438,757

(22) Filed: Nov. 11, 1999

(30) Foreign Application Priority Data

Nov. 21, 1998 (DE) .............................................. 198 53 790

(51) Int. Cl.$^7$ ................................................... F03D 7/02
(52) U.S. Cl. .............................. 415/4.3; 415/4.5; 415/62; 415/908
(58) Field of Search ............................... 415/4.2, 2.1, 4.3, 415/4.4, 4.5, 60, 62, 907, 908, 10, 11

(56) References Cited

U.S. PATENT DOCUMENTS

| | | | |
|---|---|---|---|
| 4,156,580 | * | 5/1979 | Pohl ........................................ 415/4.4 |
| 4,350,900 | * | 9/1982 | Baughman ......................... 415/211.1 |
| 6,157,088 | * | 12/2000 | Bendix .................................... 290/55 |

FOREIGN PATENT DOCUMENTS

| | | |
|---|---|---|
| 26 20 862 C2 | 11/1977 | (DE) . |
| 296 734 A5 | 12/1991 | (DE) . |
| 196 15 943 A1 | 10/1997 | (DE) . |
| 196 48 632 A1 | 4/1998 | (DE) . |
| 2 041 457 A | 9/1980 | (GB) . |

* cited by examiner

Primary Examiner—F. Daniel Lopez
Assistant Examiner—James M McAleenan (57) ABSTRACT

A wind generator with a rotor which rotates in the horizontal direction and has a plurality of rotor blades, wherein the rotor blades are surrounded in some areas by a fairing, the fairing being aligned according to the wind direction so that the rotor blades which are running in the opposite direction to the wind direction are always protected. The wind generator is provided preferably for subsequent fixing on already existing masts wherein the device has an annular bearing ring on which the rotor rotates on bearings, the bearing ring extending around the mast and being fixed by connecting braces on the mast.

22 Claims, 6 Drawing Sheets

WIND GENERATOR

BACKGROUND OF THE INVENTION

Field of the Invention

The invention relates to a wind generator with a rotor which rotates in a horizontal direction and to a rotor for this horizontally rotating wind generator which has a plurality of rotor blades and is connected to a generator.

Known wind driven device are disposed on high masts in order for their large rotors to be directed sufficiently against the wind. In this case the rotors are aligned vertically and rotate about a horizontal axis. As a rule the vertical axis is connected to a driven device. Due to the vertical arrangement, however, unpleasant shadows can form, particularly when the incidence of light is unfavorable. Furthermore, enormously high masts are necessary in order to guarantee adequate performance. The heavy gears by which the rotors are connected to the generator often lead to static problems with the towers. In high winds enormous forces are exerted on the mast, which can lead to fracture.

A windmill which rotates about a vertical axis and is surrounded in some areas by a housing is known from GB 20414587 A. The housing is set into wind by an alignment device so that the rotor blades running the opposite direction to the wind are protected.

A wind generator is known from DE 26 20 862 in which the rotors which rotate about a horizontal axis are fixed by a clamping frame around a mast. In this case each pair of rotors is fixed to the right and the left of the mast and aligned against the wind by the clamping frame which is mounted so as to be rotatable about the mast.

A wind generator which rotates about a vertical axis is known from DD 296 734, wherein the impeller is surrounded by a protective shield in the shape of a circular segment which rotates about the axis of the impeller.

A solar installation is known from DE 196 15 943 which ban be built up as required from a plurality of standard modules, the modules being not only conventional solar modules but also conventional wind generators which rotate about a horizontal axis.

A wind generator is known from DE 38 29 112 which has a rotor which is equipped with blades and is connected to a a generator and which is encased by a housing which can be freely aligned in the desired wind direction. In this case the housing has a funnel-shaped inlet which is provided with air deflectors. The air should be accelerated by an air outlet which is smaller. The inflow funnel is aligned against the wind.

A wheel-like wind generator is known from DE 196 48 632 in which the rotor has a plurality of dish-shaped rotor blades, the windmill being surrounded by a housing which is constructed like the housing of the windmill which is known from the publication DE 38 29 112.

SUMMARY OF THE INVENTION

The object of the present invention is to provide a wind generator which has a high degree of efficiency and is simple to install, and which can be combined with already existing wind driven device. It should also be possible to extend it as required without great technical and financial outlay. A further object consists of the simply fixing of the device on existing towers. Yet a further object consists of avoiding the unpleasant formation of shadows of the conventional windmills. Yet a further object consists of providing a rotor for this device which rotates in the horizontal direction and has optimum aerodynamic characteristics in order to minimize the air resistance of the air which is flowing back.

This object is achieved by the features of claims 1, 3, 9 and 20, particularly by a rotor for a horizontally rotating wind generator which has a plurality of rotor blades and is connected to a generator, wherein the rotor blades are surrounded in some areas by a fairing, the fairing being aligned by alignment means according to the wind direction so that the rotor blades which are running in the opposite direction to the wind direction are always protected.

In order to ensure a high degree of effectiveness, the fairing surrounds and protects at least half of the rotor blades.

In a further embodiment of the rotor according to the invention, the rotor blades are completely surrounded by a fairing, and the fairing has an air inlet and an air outlet and is aligned by alignment means according to the wind direction so that the air inlet is aligned optimally against the wind direction.

For this purpose the fairing is rotatably mounted and is aligned by a fairing alignment device like a weather vane.

In a further embodiment the fairing is aligned by a servomotor which is controlled by a wind sensor.

In order to be able to extent existing wind generators sensibly, the wind generator has means for subsequent fixing on existing masts. This wind generator consists of an annular rotor which rotates in the horizontal direction and has a plurality of rotor blades. The wind generator also includes an annular bearing ring on which the rotor rotates on bearings, wherein the bearing ring extends around the mast and the bearings are fixed on the mast by connecting braces. A reversal of this principle is also conceivable, so that the bearing ring is static and the rotor is connected to bearings which run on the bearing ring.

The connecting braces are designed so that they can be variably fixed on masts of differing thicknesses without the need for substantial structural alterations to be undertaken. The rotor is connected to a generator by way of a gear. The rotor is constructed like a toothed wheel on its inner face which is directed towards the mast, and a second toothed wheel engages in this first toothed wheel and is connected by way of a gear shaft to the generator.

In a further embodiment the transmission of force takes place through a friction drive which transfers the force to the generator by way of a belt and optionally a gear.

The annular construction makes it readily possible to fix on existing masts or on wind generators which are to be installed. In particular a plurality of the described wind generators can be fixed one above the other on a mast. Also joint use of the transformer is conceivable. The segmentation of the rotor and of the bearing ring permits later assembly.

Further advantageous embodiments are set out in the subordinate claims.

BRIEF DESCRIPTION OF THE DRAWINGS

A detailed description with reference to the drawings, in which.

The same reference numerals refer to the same parts throughout the various Figures.

DESCRIPTION OF THE PREFERRED EMBODIMENT

Figure 1:
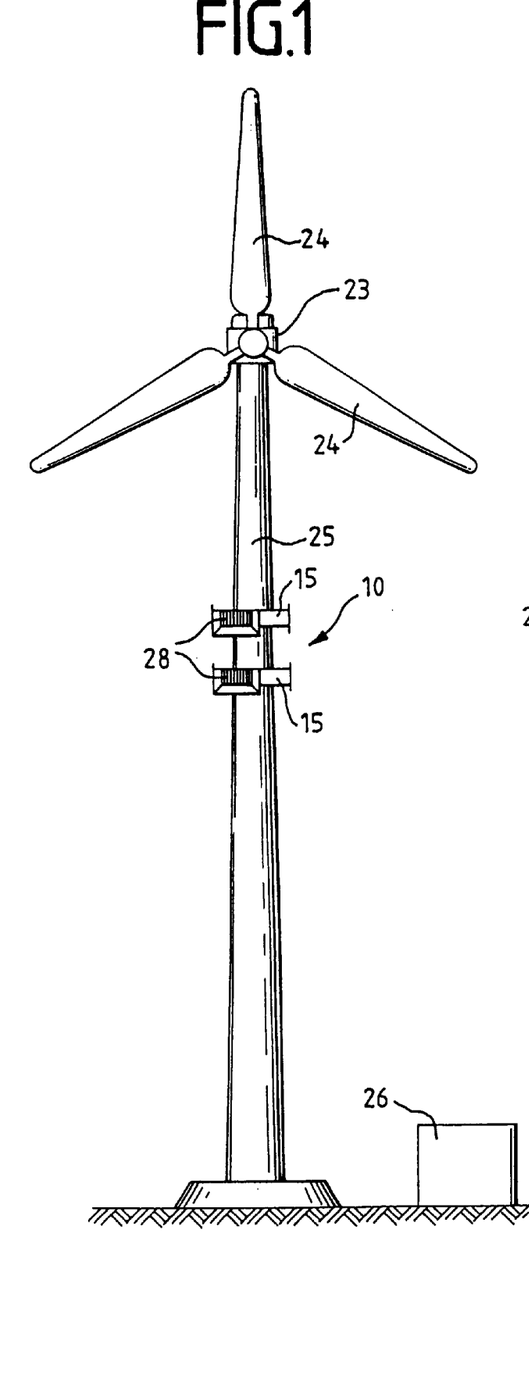
FIG. 1 shows a conventional wind generator with a rotor rotating vertically about a horizontal axis, on the mast of which are fixed several wind generators according to the invention which rotate horizontally, their complete fairing having an air inlet.

With reference now to the drawings, and in particular to FIG. 1 thereof, the preferred embodiment of the new and improved wind generator embodying the principles and concepts of the present invention will be described.

FIG. 1 shows a wind driven device 23 with a plurality of wind generators 10 according to the invention fixed on its mast 25. In this case the wind generators 10 according to the invention are disposed horizontally, one above the other. The wind generators 10 according to the invention are preferably fixed below the vertically rotating rotor 24 in order to avoid wind turbulence.

Figure 3:
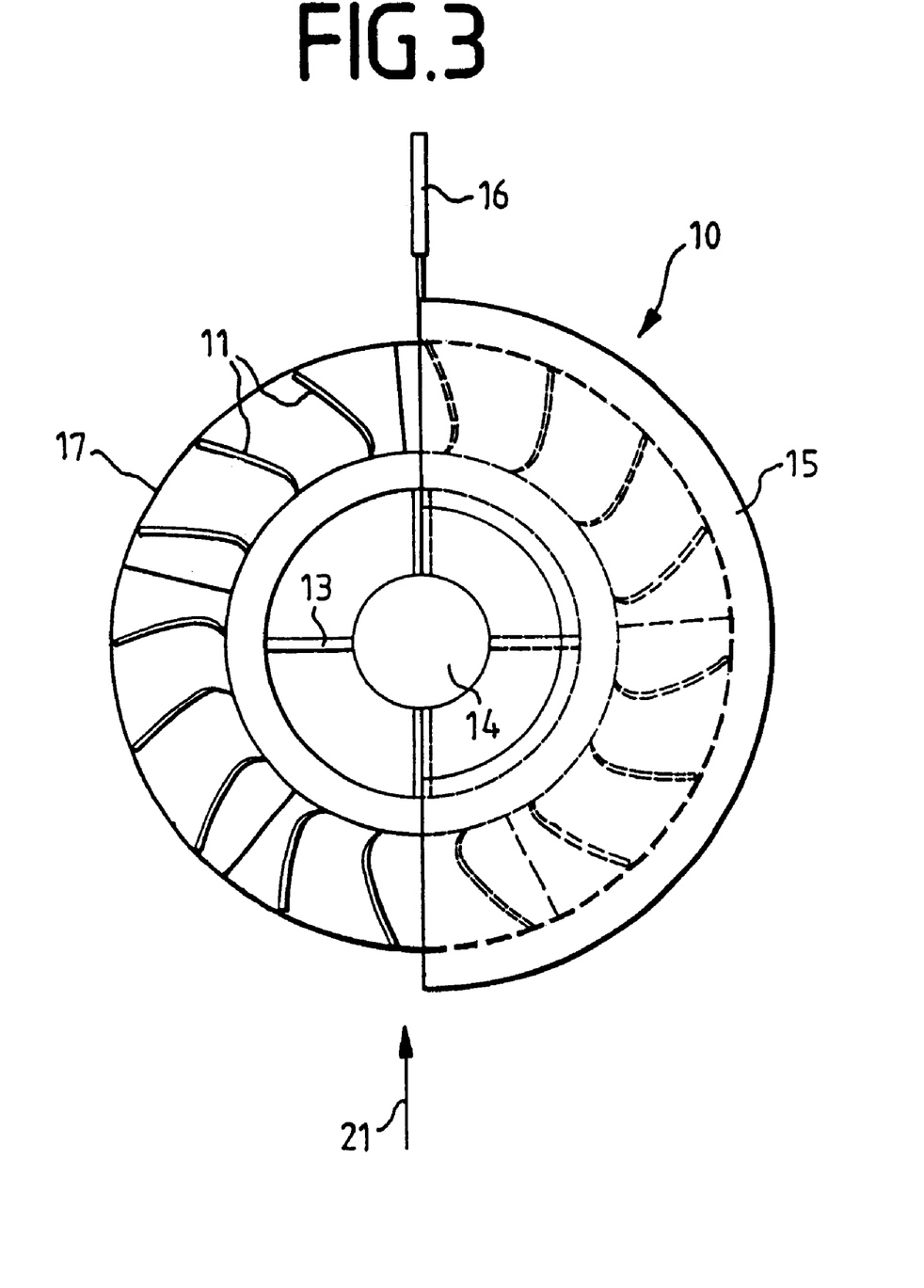
FIG. 3 shows a top view of a wind generator according to the invention, with an annular rotor which has a plurality of rotor blades, half of the rotor and of the blades being surrounded by a fairing which is aligned by a wind-controlled fairing alignment device.
Figure 5:
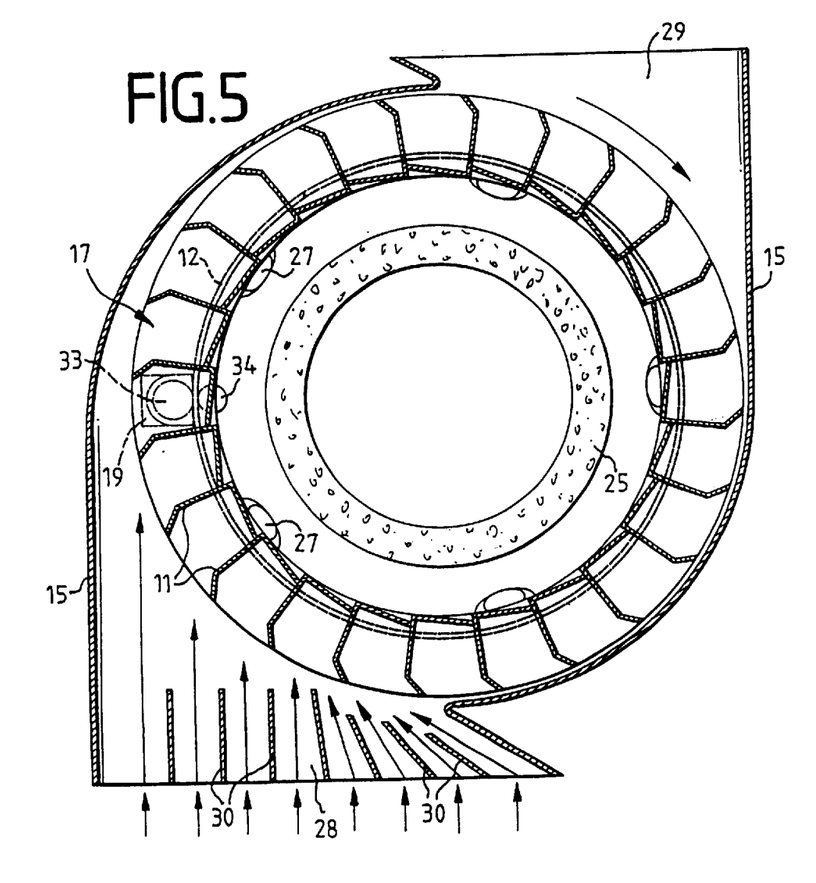
FIG. 5 shows a diagrammatic top view of a rotor according to the invention which is completely surrounded by a fairing, the fairing having a funnel-shaped air inlet which is provided with air deflectors, and with an air outlet which is disposed so that with the aid of the shaping of the fairing a Venturi effect is produced.

The wind generators according to the invention consist of an annular rotor 17, such as can be seen from FIGS. 3 and 5, which rotates about the mast 25 and is protected by a fairing. FIG. 1. shows that the fairing has a funnel-shaped air inlet which is directed against the wind. The current generated by the wind generators is converted to the required voltage and frequency in a transformer 26 which is normally disposed on the ground.

Figure 2:
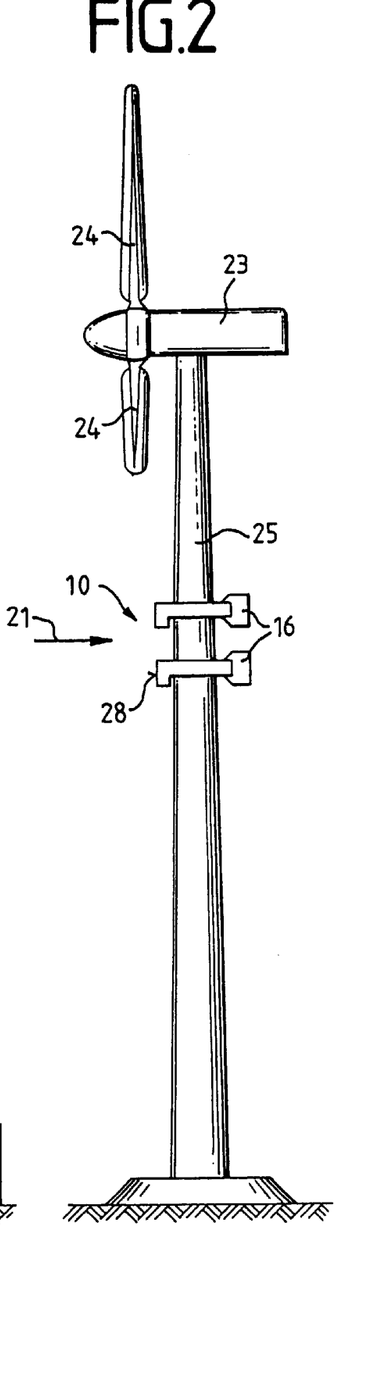
FIG. 2 shows a side view of the wind generators illustrated in FIG. 1, wherein the fairing is aligned by a wind-controlled housing alignment device.

FIG. 2 shows a side view of the device shown in FIG. 1. This view reveals a fairing alignment means 16 which is controlled like a vane by the wind and aligns the fairing 15.

FIG. 3 shows the construction of the wind generator 10 in detail. The wind generator has the rotor 17 which is of annular construction so that it can rotate about the mast 25. Rotor blades 11 are fixed on the outside of the rotor 17 and are preferably of spoon-shaped construction. However, other shapes are also conceivable. Half of the rotor 17 is surrounded by the fairing 15, which preferably has a U-shaped cross-section. The fairing 15 is likewise rotatably mounted and is aligned according to the wind direction 21 so that the rotor blades 11 running in the opposite direction to the wind are protected. A possible mounting of the fairing can be seen in FIG. 9. The fairing 21 is preferably aligned by a fairing alignment device 16 which is of correspondingly large dimensions and acts like a vane. The fairing alignment device 16 is preferably fixed on the rear edge and on the side of the fairing 15 remote from the wind.

In an alternate embodiment the fairing 15 is aligned by way of a servomotor (not shown) which is controlled by a wind direction sensor (not shown).

A further possible construction of the fairing 15 can be seen in FIG. 5. In this case the rotor 17 is almost completely surrounded by the fairing. The fairing has only one air inlet 28 which is always aligned against the wind by the said means and is disposed so that the wind acts directly on the rotor blades 11 of the rotor 17. The fairing also has an air outlet 29. Thus the fairing 15 gives the device 10 a construction in the form of a pump or turbine. The air inlet 28 is preferably of funnel-shaped construction and has air deflectors 30 which deflect the wind in the most optimum manner possible onto the rotor blades 11. Depending upon the arrangement of the funnel the wind should be redirected in the direction of rotation. If as in the present case the funnel is disposed laterally, then the setting angle of the air deflectors 30 alters the closer they are disposed to the center of the rotor 17.

Figure 4:
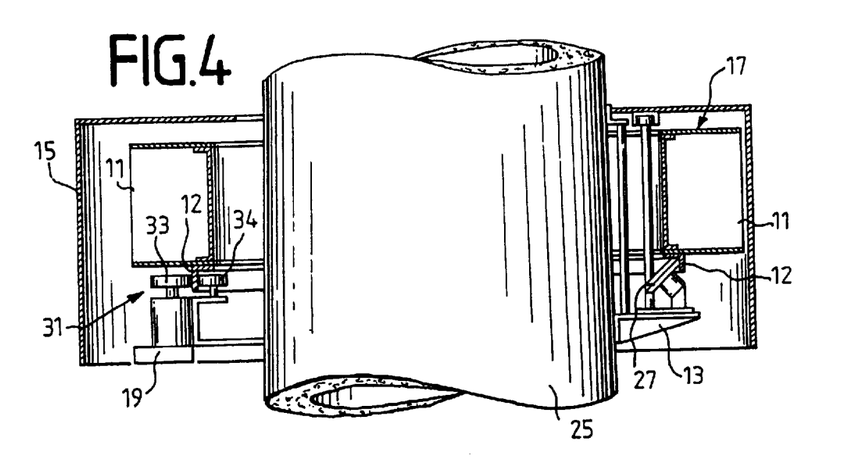
FIG. 4 shows a diagrammatic side view of the device according to the invention which is disposed around a mast, the rotor being disposed on an L-shaped bearing ring which rotates on bearings disposed at an angle of 45 degrees, the rotor being connected by way of a friction wheel drive to a generator.
Figure 7:
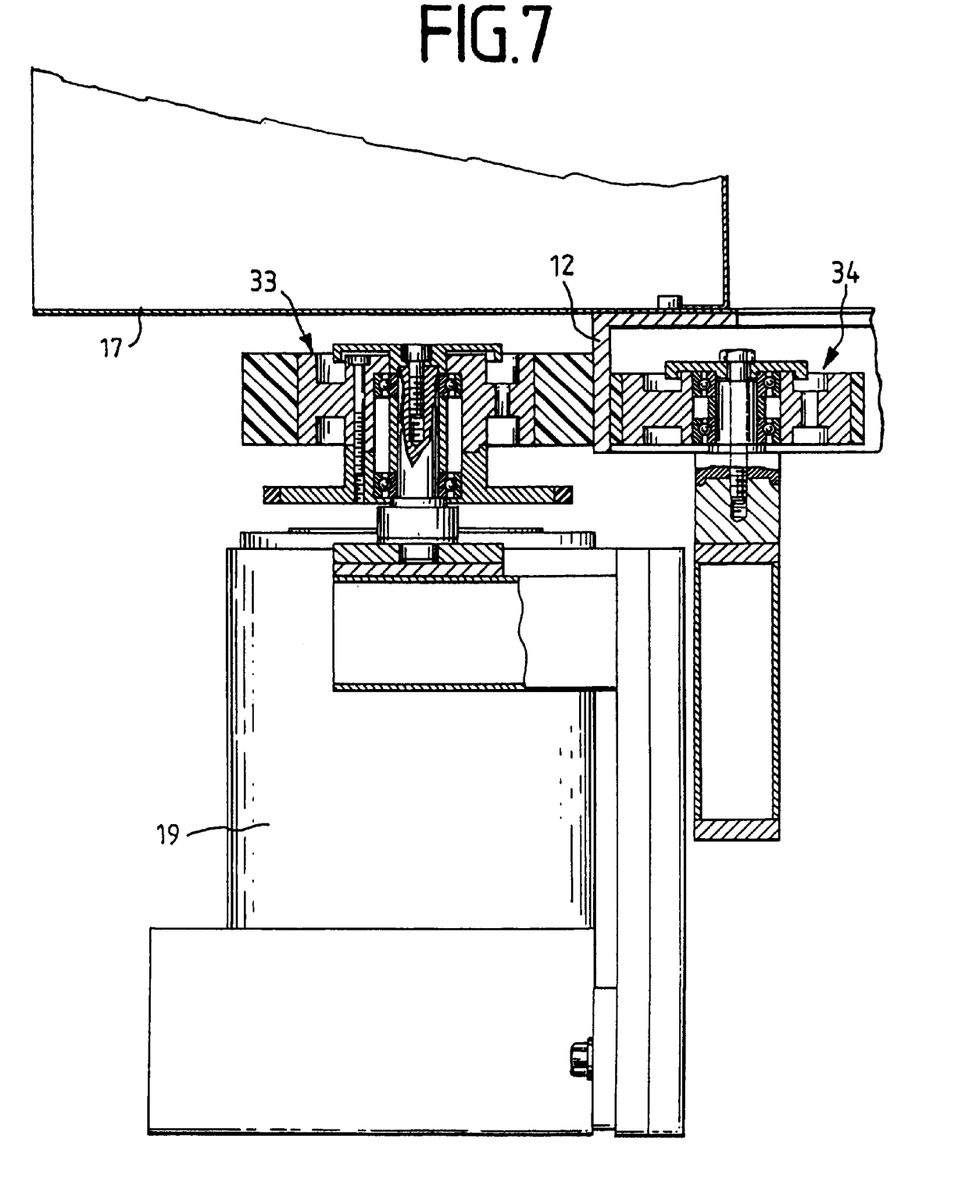
FIG. 7 shows a section along the side view of FIG. 6, with the generator, the friction wheel, and the L-shaped bearing ring on which the rotor is disposed.

FIG. 3 also shows the mounting which is described in greater detail in FIGS. 4 and 7. The bearing consists of an L-shaped bearing ring 12 on which the rotor 17 is fixed. Bearings 27 in the form of impellers are disposed at an oblique angle between the flanks of the bearing ring 12. This drawing also shows the arrangement of a generator 19 which is connected, without gearing, directly by way of a friction wheel drive 31 to the rotor 17.

As can be seen from FIG. 4, the rotor 17 is fixed on an L-shaped bearing ring 12 which extends around the mast 25. Bearings 27 which are disposed on connecting braces 13 extend radially with equiangular spacing around the mast 25. In this case the bearing 27 are preferably disposed at an angle of 45 degrees and extend with their outer running surface into the angle which is formed by the flanks of the bearing ring 12. In this case the bearing 27 is preferably constructed as an impeller.

The connecting braces 13 are connected to the mast 25 with their side opposite to the bearing 27.

FIG. 4 also shows the arrangement of the generator 19. This is preferably suspended below the rotor 17. The rotor 17 is connected to the generator 19 by way of the L-shaped bearing ring by a friction wheel drive 31 which is illustrated in greater detail in FIG. 6. A gear shaft 20 of the generator 19 is connected to a friction wheel 33 either directly or by way of a gear 18. The friction wheel 33 is pressed by a tension wheel 34 against the preferably vertical flank of the L-shaped bearing ring 12. The generator 19 is likewise connected by a connecting brace 13 to the mast 25. Depending upon the speed of the rotor 17 the friction wheel may or may not be applied. Thus the rotor 17 can begin to rotate easily without having contact with the generator 19.

Figure 6:
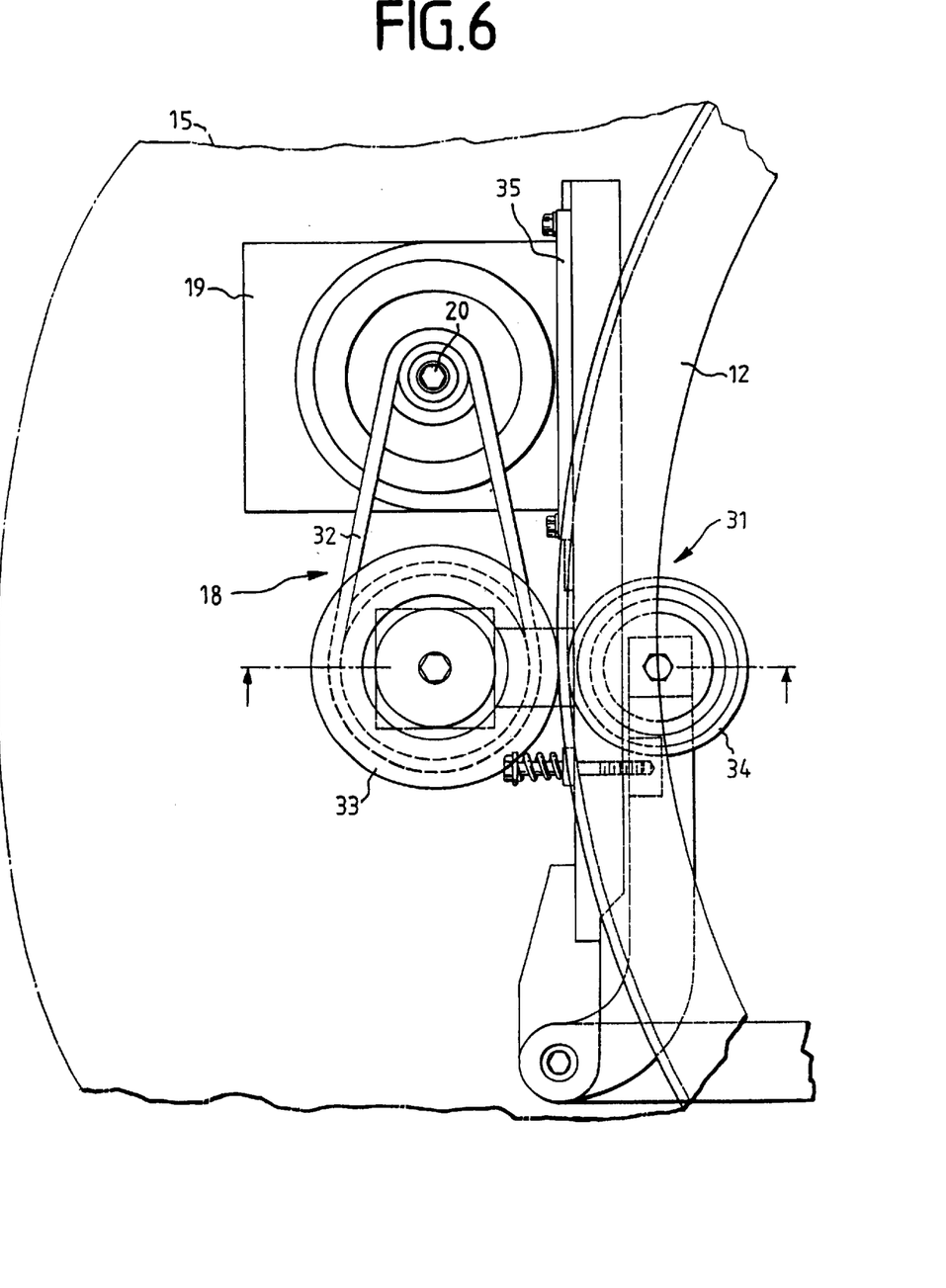
FIG. 6 shows a detail of the friction wheel drive which has a friction wheel and a tension wheel which rests against one flank of the L-shaped bearing ring, the power being transmitted to the generator by a belt.

FIG. 6 shows the details construction of the friction wheel drive 31. In this case the generator 19, the friction wheel 33 and the tension wheel 34 are disposed on a frame 35 which in turn is connected by way of a connecting brace 13 to the mast 25. The friction wheel 33 is connected by way of a belt 32 to the gear shaft 20 of the generator 19. In this way specific transmission ratios can be predetermined. The friction wheel 33 is pressed by spring force against the vertical flank of the L-shaped bearing ring 12. In order to have a corresponding friction wheel, the tension wheel 34 is pressed against the friction wheel 33 on the opposite side of the flank with the aid of a spring. Thus pressure is exerted on the flank on both sides, facilitating transmission of force without friction losses.

Other forms of gears are likewise conceivable. For instance, known automatic gears which always keep the generator at an optimum speed could be used. These gears are controlled as a function of the rotation of the rotor.

FIG. 7 shows the drive in side view. In this special form the generator 19 is connected directly by way of its gear shaft 20 to the friction wheel. On the side opposite the flank of the L-shaped bearing ring 12 the tension wheel 34 is disposed so that pressure is exerted from both sides of a flank onto the vertically running flank. The friction wheels are preferably mounted on ball bearings.

In a further embodiment (not shown) the bearing ring is constructed on its inner face like a toothed wheel in order to drive a second toothed wheel. The second toothed wheel is, for example, connected by way of a gear shaft 20 to the generator 19.

Further forms of transmission of force are conceivable. Thus, transmission could take place with the air of belts, discs slip clutches or other known force transmission means.

Likewise, the generator 19 could be directly integrated in the rotor 17 so that the rotor 17 and the bearing ring 12 act in coordination as a generator.

Figure 8:
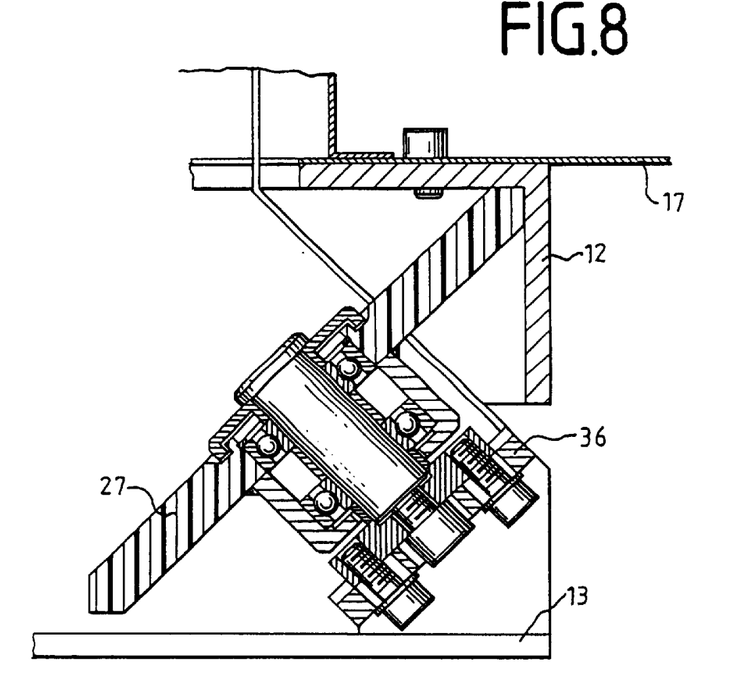
FIG. 8 shows in detail a section along the side view of the mounting of the rotor which is fixed on an L-shaped bearing ring, wherein a bearing which is constructed in the form of a bearing wheel is fixed at an angle of 45 degrees on a stationary belt.

FIG. 8 shows a detail of the mounting. In this case the bearing 27 is formed as a wheel, the axle of which is disposed at an angle of 45 degrees. The wheel is mounted on two ball bearings which are disposed in a housing fixed on a frame 36. The frame 36 in turn is connected to a connecting brace 13. The running surface of the wheel is preferably continuous, so that the running surfaces abut with an accurate fit in the angle formed by the flanks of the L-shaped bearing ring.

Figure 9:
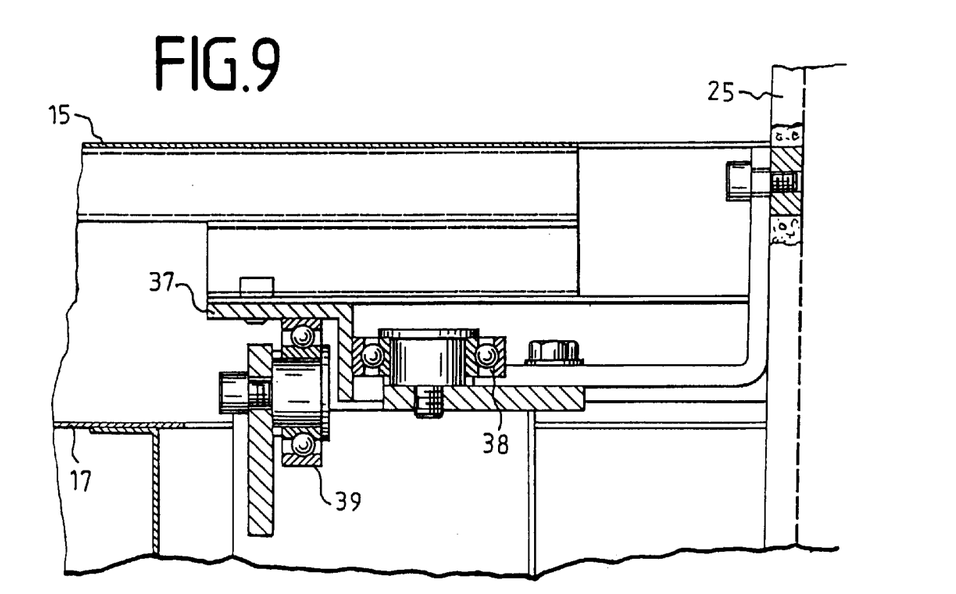
FIG. 9 shows a diagrammatic side view of a possible mounting of the fairing horizontally on the rotor, with an L-shaped bearing ring, the flanks of which are guided by two bearings.

FIG. 9 shows the mounting of the fairing 15 on the rotor 17. In this case two ball bearing 38, 39 are disposed at an angle of 90 degrees with respect to one another, each resting on the flank of an equally L-shaped bearing ring 37. The bearings 38, 39 are fixed on the fairing 15. This type of mounting is disposed several times on the rotor 17 on the circular path of the bearing ring 37 which is connected to the fairing 15.

Another mounting, e.g. directly on the mast without contact with the rotor by way of further connecting braces corresponding to the mounting of the rotor is likewise conceivable. In this way the friction of the rotor can be kept low.

Also the housing can be mounted so that it supports as can be seen from FIG. 4.

Other forms of mounting can also be imaged. Thus air-conditioned or fluid-cushioned mounting could enormously reduce the friction of the rotor and lead to increased energy efficiency. In this case a cushion of air or fluid is built up by known means below the rotor and the rotor slides on it. Also a magnetic mounting is conceivable. Thus the bearing is produced by two magnets aligned in opposite directions.

For subsequent fixing of the wind generator 10 both the rotor 17 and the bearing ring 12 can be divided so that they can be passed round an existing mast 25. The division is preferably into equal-sized segments.

Far-reaching use of the wind generator 10 taking account of differing mast thicknesses is achieved by variable connecting braces 13. The connecting braces 13 connect the bearings 17 to the mast 25. They can have differing lengths in order to take account of the differing mast thicknesses.

The wind generators which are subsequently fixed can use an existing transformer 26 in order to feed the power obtained into the public mains.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A wind generator mounted to a mast comprising:
   an annular rotor which rotates about a vertical axis, wherein said rotor includes a plurality of rotor blades, and is connected to a generator, and wherein said rotor is supported by an annular bearing fixed to the mast by an adjustable connecting means.

2. A wind generator as claimed in claim 1, wherein the connecting means are connecting braces and the connecting braces are designed so that they can be variable fixed on masts of differing thicknesses.

3. A wind generator as claimed in claim 1, wherein at least one of the annular rotor an the annular bearing comprises segments which are fitted together.

4. A wind generator as claimed in claim 1, wherein the rotor blades are surrounded in some areas by a fairing in the shape of a segment of a ring, the fairing being aligned by alignment means according to the wind direction so that the rotor blades which are running in the opposite direction to the wind direction are always protected.

5. A wind generator as claimed in claim 2, wherein the fairing preferably surrounds and protects at least half of the rotor blades.

6. A wind generator as claimed in claim 1, wherein the rotor blades are surrounded by an annular fairing, and the fairing has an air inlet and an air outlet and is aligned by alignment means according to the wind direction so that the air inlet is directed optimally against the wind direction.

7. A wind generator as claimed in claim 6, wherein the air inlet is of funnel-shaped construction, so that by correspondingly smaller dimensioning of the air outlet a Venturi effect is produced as much as possible as the air flows through the fairing, leading to a higher rotation speed of the rotor.

8. A wind generator as claimed in claim 7, wherein the air inlet has at least one air deflector which guides the air optimally against the rotor blades.

9. A wind generator as claimed in claim 4, wherein the fairing is rotatable relative to the mast and the alignment means is one of a weather vane or a servomotor controlled by a wind sensor.

10. A wind generator as claimed in claim 4, wherein one of the fairing, the fairing alignment device, and/or the rotor are produced form composite plastics and or light alloys.

11. A wind generator as claimed in claim 1, wherein the rotor blades are of spoon-shaped or shovel-shaped construction.

12. A wind generator as claimed in claim 1, wherein the force transmission means is a friction wheel drive which is frictionally connected to the rotor and is connected by a belt, a chain, or directly to a generator.

13. A wind generator as claimed in claim 1, wherein an inner face of the rotor includes toothed wheel, and a second toothed wheel is connected to the generator by way of a gear shaft that engages the first toothed wheel.

14. A wind generator as claimed in claim 1, wherein a gear is connected between the rotor and the generator.

15. A wind generator as claimed in claim 14, wherein the gear automatically selects between different gear ratios as a function of the speed of the rotor.

16. A wind generator as claimed in claim 14, wherein the annular bearing consists of a bearing ring which has two flanks forming an L-shaped cross-section, wherein a bearing member is disposed between the flanks of the bearing ring so that the outer edge of the bearing member rests in a point of intersection of the flanks of the bearing ring.

17. A wind generator as claimed in claim 1, wherein the annular bearing is a low-friction air cushion mounting.

18. A wind generator as claimed in claim 1, wherein the annular bearing is a low-friction fluid cushion mounting.

19. A wind generator as claimed in claim 1, wherein the annular bearing is a low-friction magnetic mounting.

20. A wind generator as claimed in claim 1, wherein the wind generator is fixed on a mast of a wind driven drive which already installed or is to be installed and which has a conventional vertically rotating rotor.

21. A wind generator as claimed in claim 20, wherein a plurality of wind generators are fixed one below the other on the mast.

22. A wind generator as claimed in claim 20, wherein the generator of the wind generator is connected to a transformer connected to the wind driven device.

* * * * *